United States Patent
Matthews et al.

(10) Patent No.: US 7,262,386 B2
(45) Date of Patent: Aug. 28, 2007

(54) METHOD OF PULSE WELDING AND CONTACT TIP THEREFOR

(75) Inventors: William T. Matthews, Chesterland, OH (US); Bryan Nelson, Chardon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 351 days.

(21) Appl. No.: 10/843,035

(22) Filed: May 12, 2004

(65) Prior Publication Data

US 2005/0252900 A1    Nov. 17, 2005

(51) Int. Cl.
*B23K 9/28*    (2006.01)

(52) U.S. Cl. .................................. 219/137.61

(58) Field of Classification Search ........... 219/137.61, 219/136, 137.44; 428/49
See application file for complete search history.

(56) References Cited

U.S. PATENT DOCUMENTS

| | | | |
|---|---|---|---|
| 2,347,646 A * | 5/1944 | Smith .......................... | 219/136 |
| 2,797,306 A * | 6/1957 | Qualey .................. | 219/137.44 |
| 2,981,825 A * | 4/1961 | Rundell ....................... | 219/136 |
| 3,025,387 A | 3/1962 | Kinney | |
| 3,142,746 A * | 7/1964 | Schmerling ............ | 219/137.61 |
| 3,249,734 A * | 5/1966 | Meyer ................... | 219/137.61 |
| 3,607,607 A * | 9/1971 | Beninga et al. ............... | 428/49 |
| 4,731,518 A | 3/1988 | Parmelee | |
| 2006/0151453 A1 * | 7/2006 | Gordon et al. ......... | 219/137.61 |

FOREIGN PATENT DOCUMENTS

| | | | |
|---|---|---|---|
| DE | 4006138 A1 * | 8/1991 | |
| FR | 2644091 | * | 9/1990 |
| JP | 64-18582 A | * | 1/1989 |

* cited by examiner

*Primary Examiner*—Clifford C. Shaw
(74) *Attorney, Agent, or Firm*—Fay Sharpe LLP

(57) ABSTRACT

A contact tip for a welding gun having a central passage for a welding wire moving in a given direction toward a workpiece and receiving a welding signal by contact of the wire with the tip. The passage has an innermost end, an outermost exit end and a length of at least 1.5 inches and an opening in the contact tip intersects the passage so a pressure block slidably mounted in the opening is biased toward the wire by a spring around the contact tip urging the block against the wire. This tip is dimensioned and constructed to perform pulse welding by a relatively ductile aluminum wire.

28 Claims, 7 Drawing Sheets

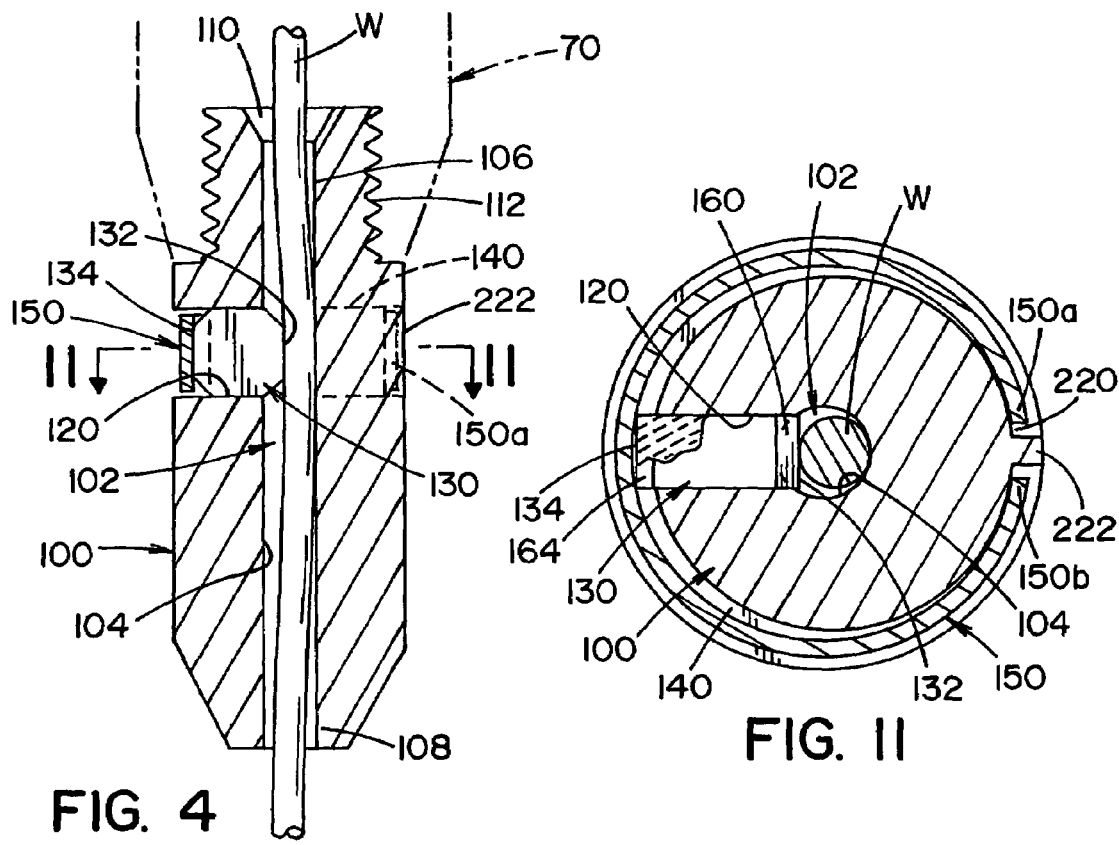
FIG. 4
FIG. 11
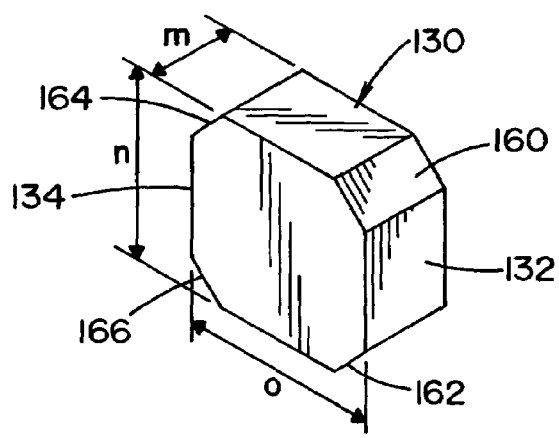
FIG. 10

METHOD OF PULSE WELDING AND CONTACT TIP THEREFOR

The present invention relates to a welding gun or torch especially designed for use in pulse welding aluminum wherein an aluminum wire passes through a contact tip positioned at the exit end of a gun. Such contact tips are well known and used consistently in welding guns of the type where a welding wire is passed through the gun, melted and used for the welding process. An example of such a contact tip for a welding gun is described in Parmelee U.S. Pat. No. 4,731,518. This patent is incorporated by reference herein to show the technology involved in the present invention. One aspect of the present invention involves a ceramic sleeve in the central passage of the contact tip to guide the wire through the tip without engaging the electrically conductive portion of the tip. An example of the use of ceramic to guide a moving welding wire through a contact tip is illustrated in Kinney U.S. Pat. No. 3,025,387, also incorporated by reference herein as background information.

BACKGROUND

In a pulse welding process where a welding wire is directed through the commonly used contact tip of a welding gun as the tip is subjected to a pulsed current signal, it is advantageous to tailor the background current and peak current to create a ball and to propel the ball at a specific time toward the workpiece. It has been found that the creation of the molten metal ball on the end of the advancing electrode depends on the spacing between the workpiece and the actual contact point of the wire with the contact tip. This distance between the contact point and the workpiece should remain coordinated with the profile of the pulse current. In this manner, the melting of the ball and the propelling of the ball are timed with the actual pulses of the electric current. Such coordination maintains the stability of the arc and assures the quality of the welding process. In other welding processes such as short arc or spray MIG welding, the coordination of the ball and propelling force with the waveform profile is not critical. In these processes, conventional tips are used satisfactorily with both iron and aluminum. In some instances, this standard short tip when not used for MIG welding included a ceramic block spring biased into the passageway to engage the wire and force the wire against the passage. Such spring biased ceramic block in a short tip was only for the purpose of ensuring contact. Thus, its expense was not justified and it was not accepted practice. The present invention relates to a contact tip specially designed for use in pulse welding aluminum wire. The aluminum wire passing through the passage of the tip engages the surface of the passage somewhere in the length. This uncertainty as to the contact point of the aluminum wire as it passes through the long contact tip reduces the stability of the arc and affects the quality of the pulsed welding with aluminum wire. In view of this background, there is a need for creating a contact tip specially designed for pulse welding with aluminum wire. A contact tip specially designed for aluminum pulse welding should also overcome the requirement for a special contact tip for each diameter and type of aluminum wire. In the past, this diameter of the passage in the contact tip had to be especially sized for each aluminum wire. Indeed, the passage was sized for the heat expansion of the specific aluminum wire. The diameter of the passage was about 0.010 inches larger than the diameter of the aluminum wire being welded. This required a special tip for each aluminum wire diameter. It has also been found that the contact tip and aluminum wire expand differently according to the process being performed and the alloy of the aluminum. Thus, the tip had to be specially designed not only for the diameter of the aluminum wire, but also for the expansion caused by heating associated to the welding process. When using aluminum wire, the welding tip had to be specially and accurately controlled as to the diameter of the passage for both pulse welding by aluminum wire and regular MIG welding by aluminum wire. Consequently, there is a need for a tip to be used in aluminum, especially for aluminum pulse welding which need not be accurately dimensioned and still present a specific, fixed contact point. This feature increases the arc stability. Prior contact tip disadvantages for the pulse welding process have been overcome by the present invention.

THE INVENTION

The present invention relates to a new method of pulse welding with aluminum wire and also a novel contact tip especially for aluminum wire, primarily for pulse spray welding of aluminum but also for conventional MIG welding of aluminum.

By implementing the inventive method of aluminum pulse welding, the melting of the aluminum and the propelling of the aluminum toward the workpiece is consistently synchronized with the pulsed current used in the process. This consistency is accomplished in a long contact tip where the aluminum wire is positively pushed against the contact tip at a fixed location spaced from the exit end of the contact tip. The distance between the contact point and the workpiece remains constant during the pulse welding process. By using this method, arc stability is maintained and the melting of the ball on the end of the aluminum wire is coordinated and synchronized with the actual current pulses of the welding process. In accordance with another aspect of the invention, the novel contact tip for use with aluminum allows the diameter of the passage in the contact tip to be enlarged so that the tip will accommodate aluminum wire having a variety of diameters. In the past, the diameter of the control passage was very close to the diameter of the wire and also was adjusted to compensate for expansion by heat during the welding process. Using the present invention, the diameter of the passage is such that aluminum wire between 0.035 inches and 0.062 inches can be processed by a single contact tip. Indeed, one embodiment of the present tip has a diameter of about 0.080 inches and can still be used for aluminum welding wire as small as 0.035 inches. This specially designed contact tip is oversized and accommodates the normal range of wire diameters used in aluminum welding, as well as, being especially advantageous for aluminum pulsed spray welding. The novel contact tip has a length greater than 1.5 inches and has a spring biased pressure block carried by the tip and forced inwardly against the wire at a position adjacent the upper portion of the contact tip. To isolate the contact point between the moving wire and the contact tip at the pressure block or pressure element, one embodiment of the invention utilizes a raised pressure pad located opposite the element or block that is forced against the wire. This causes a pinching action at a specific location in the long contact tip to assure that the welding process using aluminum wire has a consistent distance between the contact point in the tip and the workpiece. Another aspect of the invention is the shape of the pressure block, which block is spring biased against the wire passing through an opening in the contact tip. This shape includes two spaced, parallel edges, each of which has a tapered upper end and a tapered lower end. Consequently, the pressure block forced against the wire has no special orientation. Irrespective of the position of the block in the opening into the passage, there is still a lead-in tapered portion, so that the aluminum wire can be pushed past the spring biased pressure block when first stringing the aluminum wire in the welding gun.

In accordance with the present invention, there is provided a method of pulse welding with an aluminum welding wire comprising moving the welding wire toward a workpiece and through a central passage of a contact tip, where the contact tip has an innermost end, an outermost wire exit end and a length of over 1.5 inches. The method involves positively urging the wire against the contact tip at a fixed position closer to the innermost end of the tip than to the exit end of the tip and passing a pulse weld signal between the contact tip and thus the welding wire and the workpiece to melt the wire by the electrical signal and deposit the molten metal wire onto the workpiece. This is a standard pulsed spray welding process using a fixed contact point instead of a movable contact point.

In accordance with an aspect of the invention, the urging of the wire is by a spring biased insulator element or block forced through an opening in the contact tip and against the wire in a manner to force the wire against the surface of the passage at a fixed location in the contact tip. The contact tip has a length in the general range of 2-3 inches. In accordance with an aspect of the invention, a shielding gas is passed toward the workpiece and around the aluminum wire as it is being melted and deposited onto the workpiece.

Still a further aspect of the present invention is the provision of a novel contact tip for a welding gun. The tip is especially applicable to aluminum and is primarily for pulse welding. The tip has a central passage for welding wire moving in a given direction toward the workpiece and receives a welding signal by the contact of the wire with the tip. The passage has an innermost end, an outermost exit end and a length of at least 1.5 inches. An opening in the side of the contact tip intersects the passage and is generally perpendicular to the given direction of movement of the wire. A pressure element or block slidably mounted in the opening moves toward and against the wire so that a spring around the contact tip can engage the element or block to urge the element against the wire moving through the passage of the tip. In the preferred embodiment, the spring is a circular sheet spring surrounding the tip and fitting in an annular groove machined in the contact tip and intersecting the opening for the movable pressure element. The groove includes a key extending between the distal ends of the spring surrounding the contact tip to orient the spring on the tip and prevent its rotation. The pressure element is a block of insulating material which, in the preferred embodiment, has a special shape with two opposite, parallel edges, each of which has tapered ends so that orientation of the pressure block is not important.

In accordance with another aspect of the present invention, the passage has a raised pressure pad located opposite the opening for the pressure block, so the pressure block and pad pinches the wire at a fixed location adjacent the upper portion of the contact tip for uniform pulsed welding by aluminum wire. The diameter of the passage is generally about 0.068 inches in diameter to accommodate all commonly used sizes of aluminum wire. In the broadest sense, the diameter of the passage is about 0.080 so that there is a clearance which can be filled with a ceramic sleeve to guide the aluminum wire through the contact tip. In one embodiment using a ceramic sleeve, there is no pressure mechanism for the wire, the wire merely engages the contact tip at a lower portion of the passage so that the ceramic sleeve prevents contact at any place, except at the outlet of the contact tip. The contact point is at the end of the passage since there is no spring that can be affected by excessive heat. This particular type of contact tip is an alternative of the present invention and is preferred from an economic perspective but not from a wide range of application perspectives. This tip uses the broadest aspect of the invention to fix the contact point of aluminum wire moving through a long tip.

The primary object of the present invention is the provision of a method for pulse welding with aluminum wire, which method provides arc stability and consistently coordinates the melting of the aluminum wire and the deposition of the molten metal with the actual profile of the current pulses used in the pulse welding process.

Another object of the present invention is the provision of a novel contact tip designed for use in the method defined above.

Yet another object of the present invention is the provision of a contact tip, as defined above, which contact tip has a spring biased pressure block forcing the wire against the surface of the passage at a fixed location adjacent the upper portion of the contact tip. This tip is used in a process where the fixed location is essential to the operation of the process. This is not the case when using the steel wire.

Yet a further object of the present invention is the provision of a novel contact tip, as defined above, which contact tip has an oversized passage to accommodate a majority of the wire sizes used in aluminum pulse welding. This novel tip need not be closely coordinated with a given wire and designed for a certain wire diameter.

These and other objects and advantages will become apparent from the following description taken together with the accompanying drawings.

BRIEF DESCRIPTION OF DRAWINGS

FIG. 4 is an enlarged cross-sectional view of the preferred embodiment of the invention shown in more detail in FIG. 3;

FIG. 10 is a perspective view of the symmetrical ceramic pressure block used in accordance with the preferred embodiment of the present invention; and, FIG. 11 is an enlarged cross-sectional view taken generally along line 11-11 of FIG. 4.

PREFERRED EMBODIMENT

Figure 1:
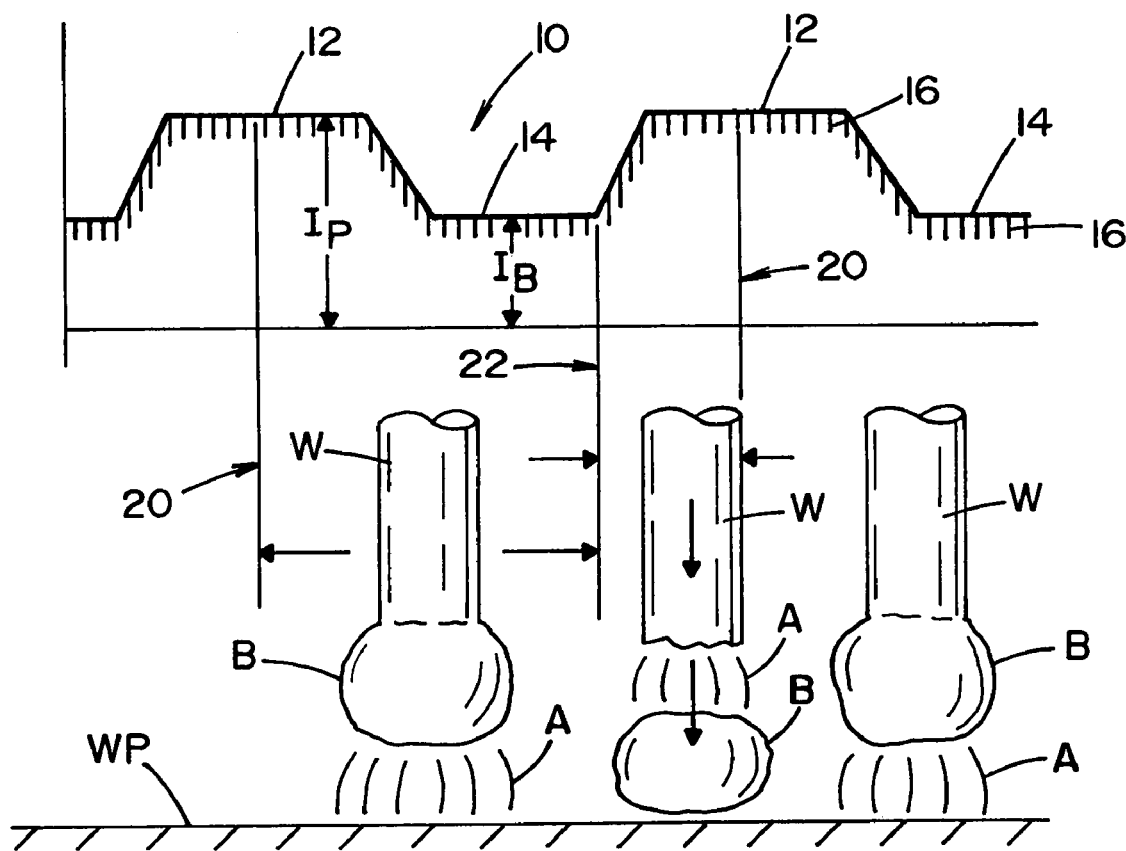
FIG. 1 is a graph of a pulse welding process coordinated with the characteristics of the electrode at different times in the welding process.
Figure 5:
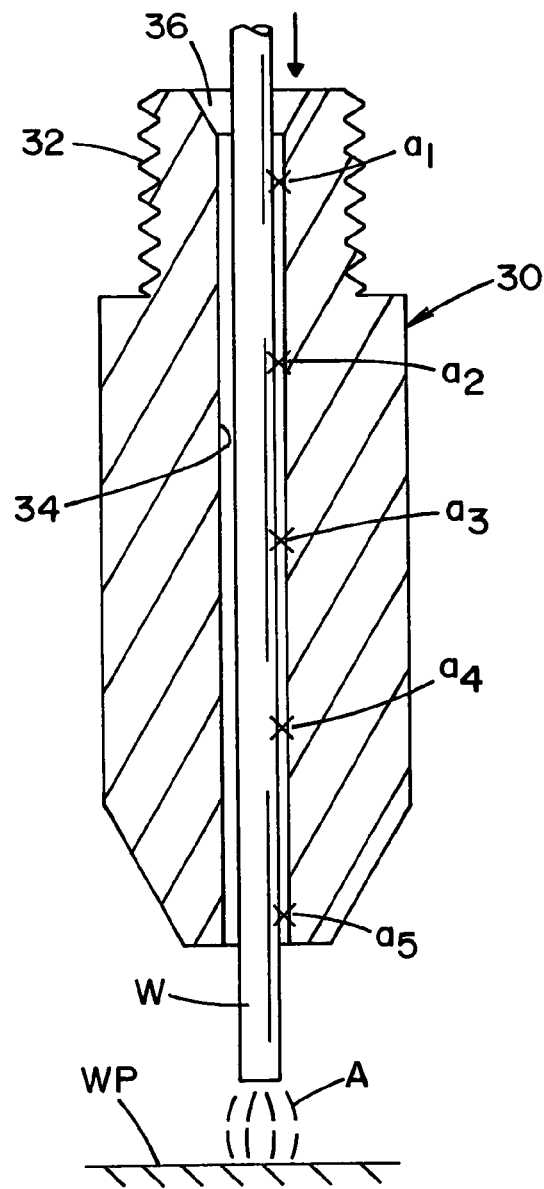
FIG. 5 is a cross-sectional view of the contact tip used for aluminum welding in the prior art.

FIG. 1 represents a pulse weld process for aluminum wire W using a standard signal 10 having peak current portions 12 and background current portions 14. Each of these portions is formed by a plurality of current pulses 16 in accordance with standard waveform technology pioneered by The Lincoln Electric Company of Cleveland, Ohio. At time or point 20, the end of wire W is liquified to form ball B. At time or point 22, ball B is released from the advancing wire by the increasing current and propelled toward workpiece WP. From point 20 to 22, a new ball is formed. This process is repeated in a pulse welding process. For uniformity and synchronization with the pulses, the contact point of wire W as it passes through a contact tip or sleeve in the welding gun must be maintained somewhat constant. This is very difficult. It is not pushed against either side of the contact tip passage as it moves through the passage. A prior art contact tip is shown in FIG. 5. Tip 30 is long to accommodate aluminum wire and has a threaded top 32 and central passage 34, with a conical lead-in 36. The length of passage 34 is greater than 1.5 inches and preferably in the general range of 2-3 inches. Passage 34 has a diameter that is about 0.005-0.010 inches greater than the diameter of wire W. Thus, each contact tip 30 is designed for a specific aluminum wire. Wire W and contact tip 30 have a different expansion coefficient, according to the welding process; therefore, the diameter of passage 34 becomes quite critical matching specific wire diameters and expansion tolerances. When using long tip 30, the wire can contact the inner surface of passage 34 at various locations illustrated as $a_1$, $a_2$, $a_3$, $a_4$ and $a_5$. Thus, when welding with aluminum wire W, especially in the very critical pulse welding process, the welding process changes drastically according to the spacing of the contact point from the workpiece W. The distance between the actual contact point and the workpiece constitutes the heated portion of wire W plus the length of arc A which should be held generally constant. A long length for passage 34 is required to assure that there is at least a point of good contact between the moving wire and contact tip 30. Contact tip 30 is used in pulse welding of aluminum together with other types of welding processes using a wire W formed of aluminum. The present invention is designed specifically for aluminum wire W and overcomes the disadvantages of contact tip 30 now used for welding processes involving aluminum wire.

Figure 2:
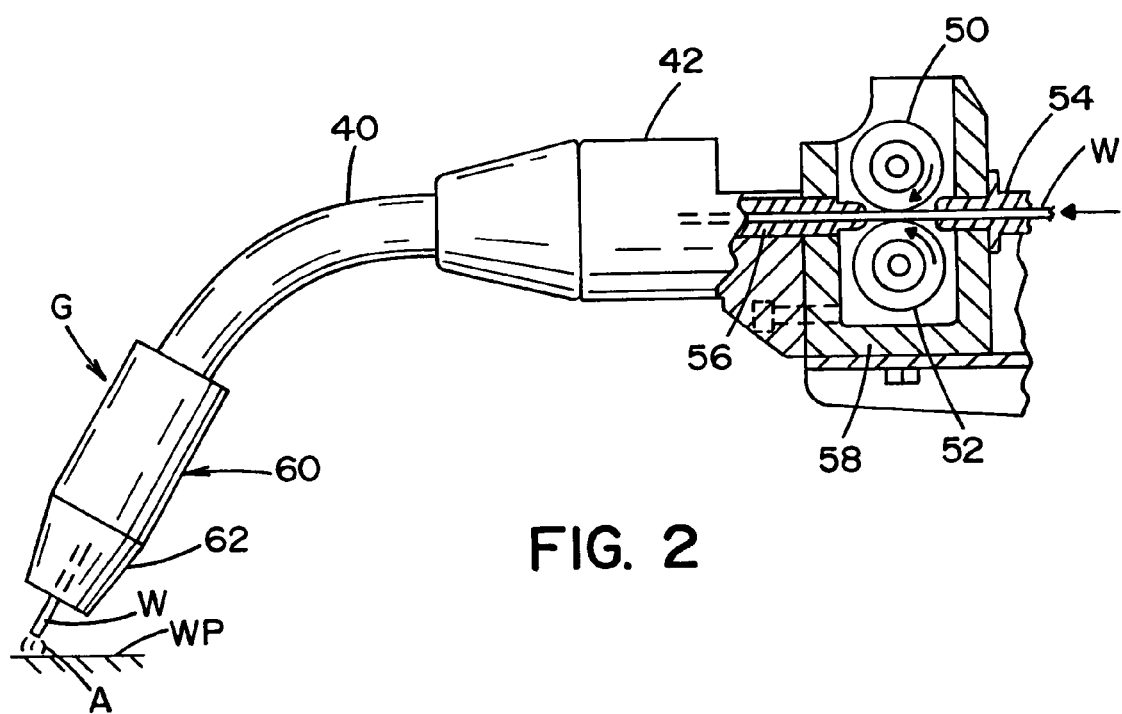
FIG. 2 is a partially cross-sectioned view of the welding gun of the type used in performing the novel welding method and using the novel contact tip of the invention.
Figure 3:
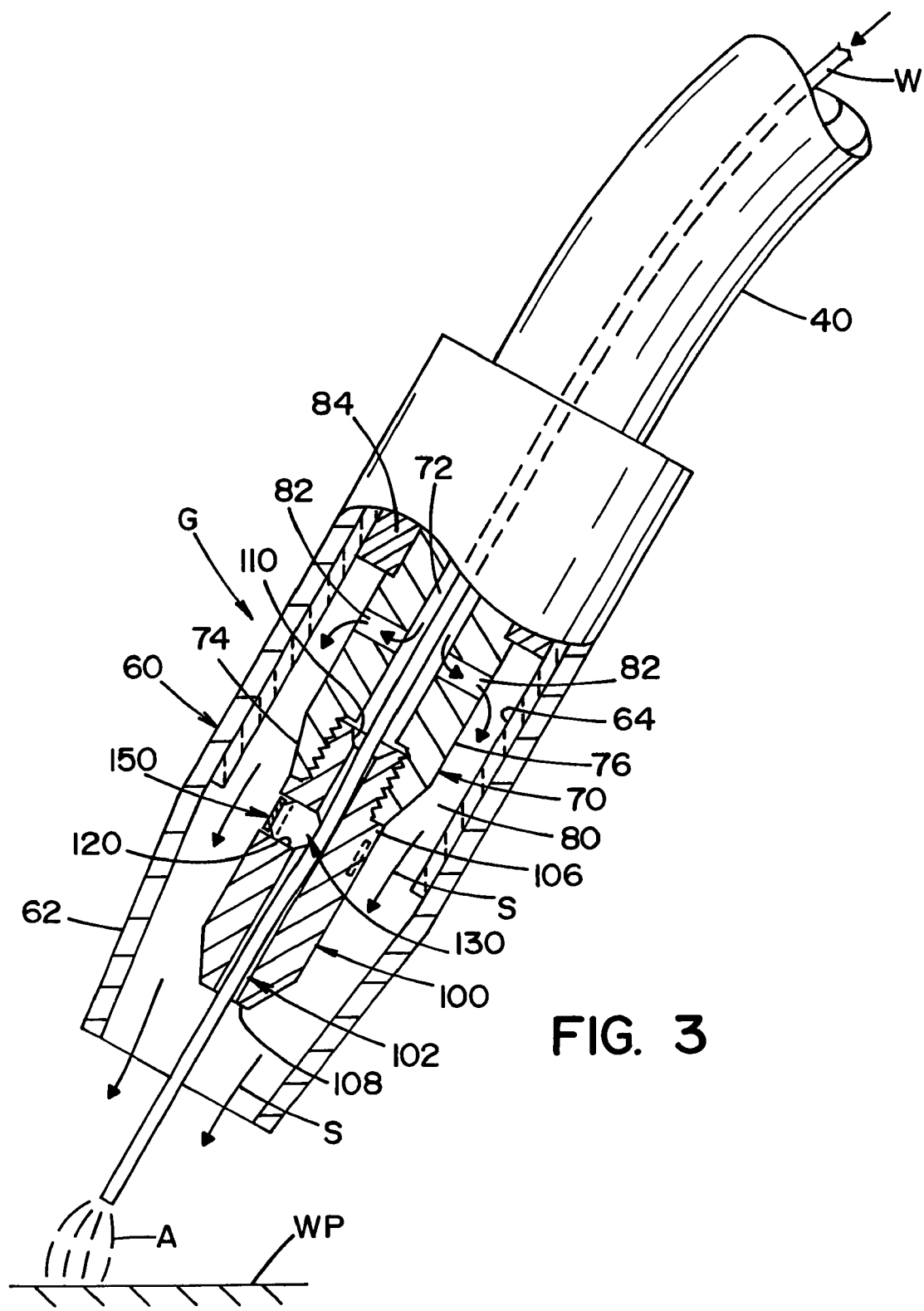
FIG. 3 is a partially cross-sectioned view of the welding gun illustrating the preferred embodiment of the present invention.

FIG. 2 illustrates a welding gun G for use of the present invention. Flexible conduit 40 is joined by connector 42 to the wire feeding mechanism illustrated as having feed rolls 50, 52 with an inlet guide 54 and an outlet guide 56 in a supporting fixed housing 58. This housing could be assembled onto a robot, automatic or semiautomatic hand held torch. Gun G includes an outer housing 60 with an inwardly tapered portion 62 and an insulating sleeve 64 as shown in FIG. 3. Mounting head 70 is a standard component and includes a center gas and wire passage 72 and a threaded receiver 74. An outer cylindrical surface 76 defines an annular shielding gas passage 80 so that openings 82 direct pressurized shielding gas S through the openings and through annular passage 80 to shield arc A during the welding process. The electric signal for the pulse welding process or other welding process is introduced through an outer power sleeve or coupling 84 to mounting head 70 for use in the welding process.

Figure 6:
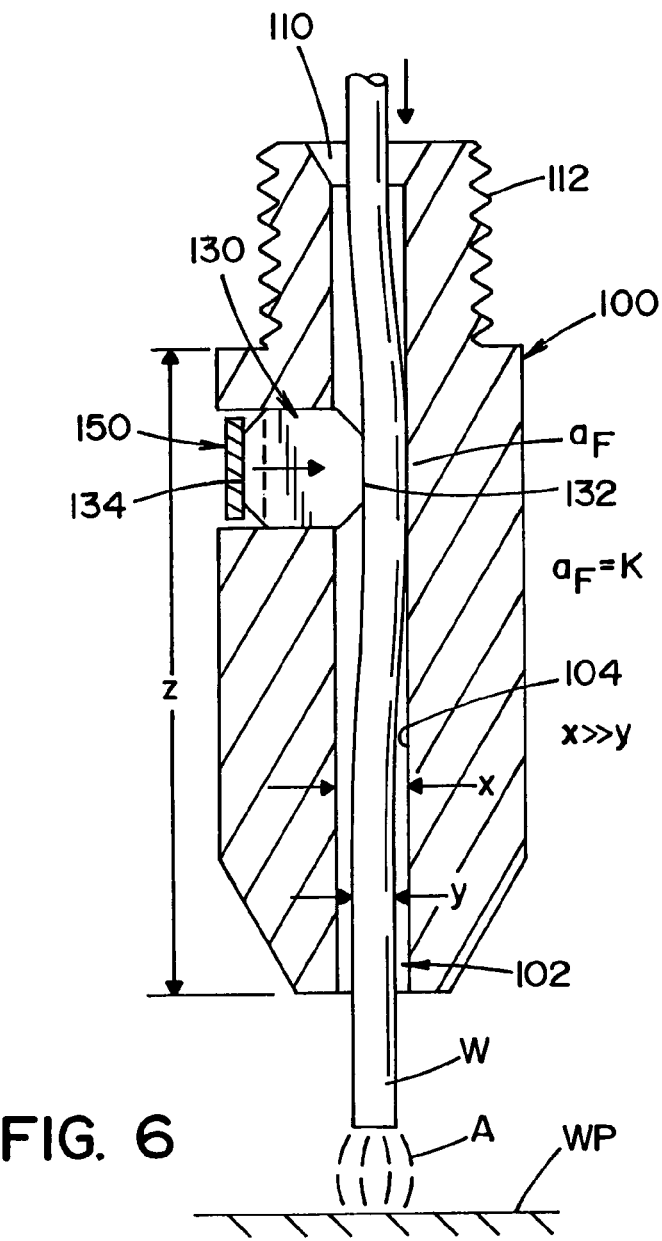
FIG. 6 is a cross-sectional view showing characteristics of a tip constructed in accordance with the preferred embodiment of the present invention.

In accordance with the present invention, a novel contact tip is designed especially for pulse welding of aluminum wire W. Novel tip 100 is best shown in FIGS. 3 and 4 as including a central passage 102 having an outer surface 104 surrounding wire W as the wire passes through gun G and through contact tip 100. Tip 100 includes an uppermost end 106 and a lowermost wire exit end 108 with an upper conical inlet 110 on threaded top 112. As so far described, contact tip 100 is a standard long tip of the type used for aluminum wire W. In accordance with the invention, a perpendicular rectangular opening 120 receives a matching rectangular pressure block 130 formed from an insulating material, such as ceramic and having an innermost pressure friction edge 132 and an outer pressure edge 134. Block 130 is generally symmetrical with two parallel edges that are identical so block 130 can fit into opening 120 with either edge facing inwardly toward passage 102. A circular groove 140 is machined in the outer surface of contact tip 100 to receive C-shaped sheet metal spring 150 mounted in groove 140 to force rectangular pressure block 130 inwardly against wire W. In this manner, the ductile wire is forced against surface 104 at a specific point opposite block 130 and closer to the uppermost end 106 than to the lowermost end 108. This spacing is to isolate springs 150 from the heat of arc A. As wire W moves through passage 102, it is forced against surface 104 by the inwardly urged block 130 so edge 132 forces the wire against the surface of the passage. Thus, there is a fixed distance between (a) the contact point of wire W with tip 100 and (b) workpiece WP. This provides arc stability and coordinates the molten metal shown in FIG. 1 with the pulses of signal 10 to optimize the welding process and prevent variations as explained in the discussion of FIG. 5. The advantage of the present invention is illustrated schematically in FIG. 6 wherein the length z of the contact tip is generally in the range of 1.5 inches and preferably in the range of 2-3 inches. By using the present invention, diameter x of passage 102 can be substantially greater than diameter y of wire W. In practice, x is preferably 0.068 inches so that the diameter is oversized and not determined by the diameter of wire W, which diameter can be as small as about 0.035 inches. By making passage 102 oversized, contact tip 100 need not be specifically dimensioned for use with a single wire, but can be used with a number of different sized aluminum wires. Irrespective of the size of the wire, the wire connects tip 100 at point $a_F$ which is fixed to give a consistent pulse welding operation or MIG welding operation for aluminum. The diameter of wire W can vary noticeably. This is a great advantage in the welding of aluminum. The inventory of tips for different wires is drastically reduced at a substantial saving.

Symmetrical ceramic pressure block 130 is best shown in FIG. 10 as including a rectangular member formed of ceramic with a width m, height n and length o. As illustrated, the height and length are the same and the width is about 25% of the height. Consequently, opening 120 is rectangular with a width of substantially dimension m and a height of substantially dimension n. According to the orientation of block 130 in opening 120 either edge 132 or edge 134 engages wire W and forces it against surface 104 at a positive contact position opposite the pressure edge. Each edge has a tapered end 160, 162, 164 or 166. In this manner, irrespective of the orientation of block 130 in opening 120, wire W first engages a tapered end to cam block 130 outwardly against spring 150 as the wire is threaded through gun G. An advantage of the present invention is the interchangeable shape of generally symmetrical block 130.

Figure 7:
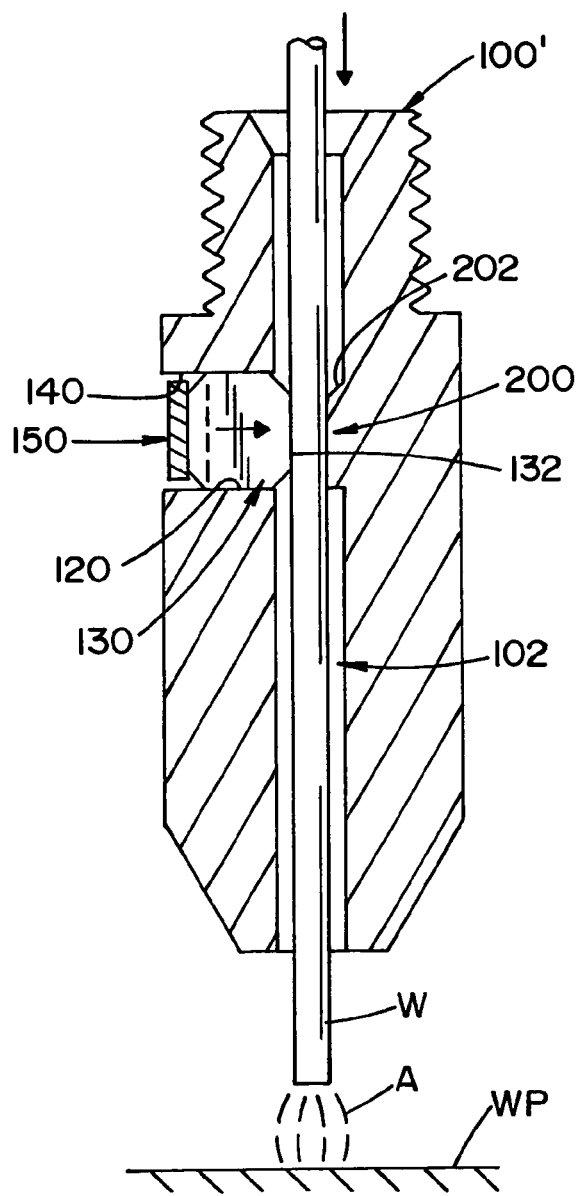
FIG. 7 is a cross-sectional view similar to FIG. 6 illustrating a modification of the preferred embodiment of the present invention.
Figure 8:
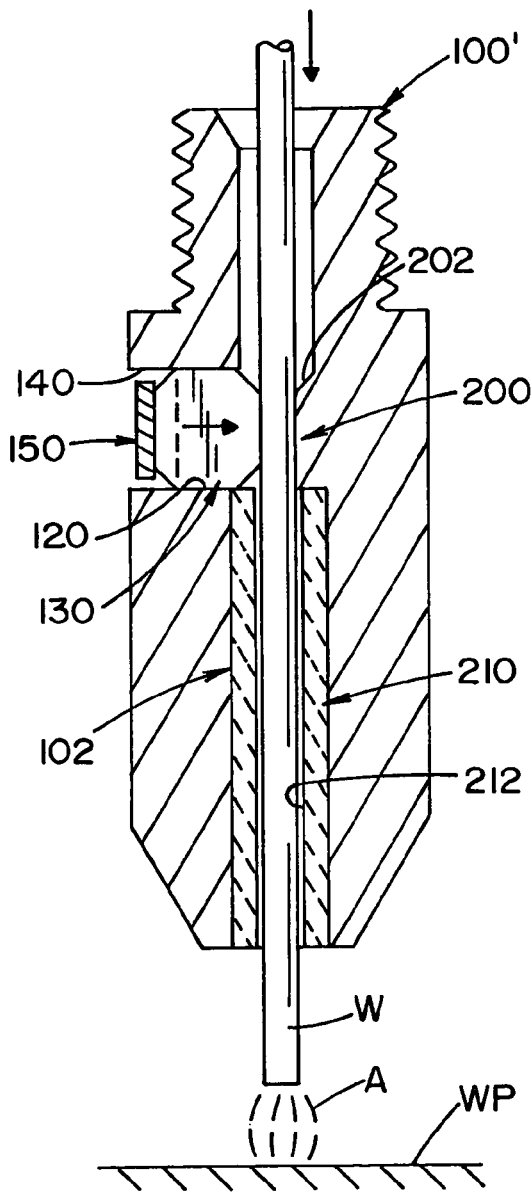
FIG. 8 is a cross-sectional view similar to FIG. 7 illustrating still a further addition to the modified embodiment of the present invention.

FIGS. 7 and 8 show a modified contact tip 100' generally the same as tip 100, except for a raised pressure pad 200 generally opposite to and matching the profile of edge 132. The pad is elongated with a width m. An upper tapered end 202 allows threading of wire W through tip 100' at the start of the welding process. Again, the diameter of opening 102 is oversized for wire W so that one tip fits generally all aluminum wires. If the wire is overly flexible and moveable in passage 102 below pressure block 130, a thin ceramic sleeve 210 can be inserted into the passage to abut against the lower end of pad 200, as shown in FIG. 8. This ceramic sleeve has an inner opening 212 generally matching the diameter of wire W. The gap is in the range of 0.005-0.010 inches. When using this insulation sleeve, a different sleeve is inserted into the same contact tip 100' to match the diameter of the wire. The only change in the tip is the selection of the ceramic guide sleeve 210 to accommodate a given wire. Thus, all the screw machine operations and boring of opening 102 is the same for all the aluminum wire diameters. A special sleeve is used for taking up the slack and preventing movement of wire W below block 130, especially for smaller diameter aluminum wires. The features of FIGS. 7 and 8 are improvements of the general invention as previously described in connection with FIGS. 2-4 and FIG. 10. Another improvement in the invention is illustrated in FIG. 11 which is a cross-sectioned view of FIG. 4. Spring 150 in groove 140 surrounds the tip and pushes pressure block 130 inwardly against wire W. The C-shaped spring has distal ends 150*a*, 150*b* defining a gap 220. By providing an elongated key boss 222 in groove 140 at a position opposite to opening 120, gap 220 is oriented with respect to boss 222. Spring 150 is held in the proper position around tip 100 or tip 100' in groove 140. This improvement in the invention is illustrated in FIGS. 4 and 11.

Figure 9:
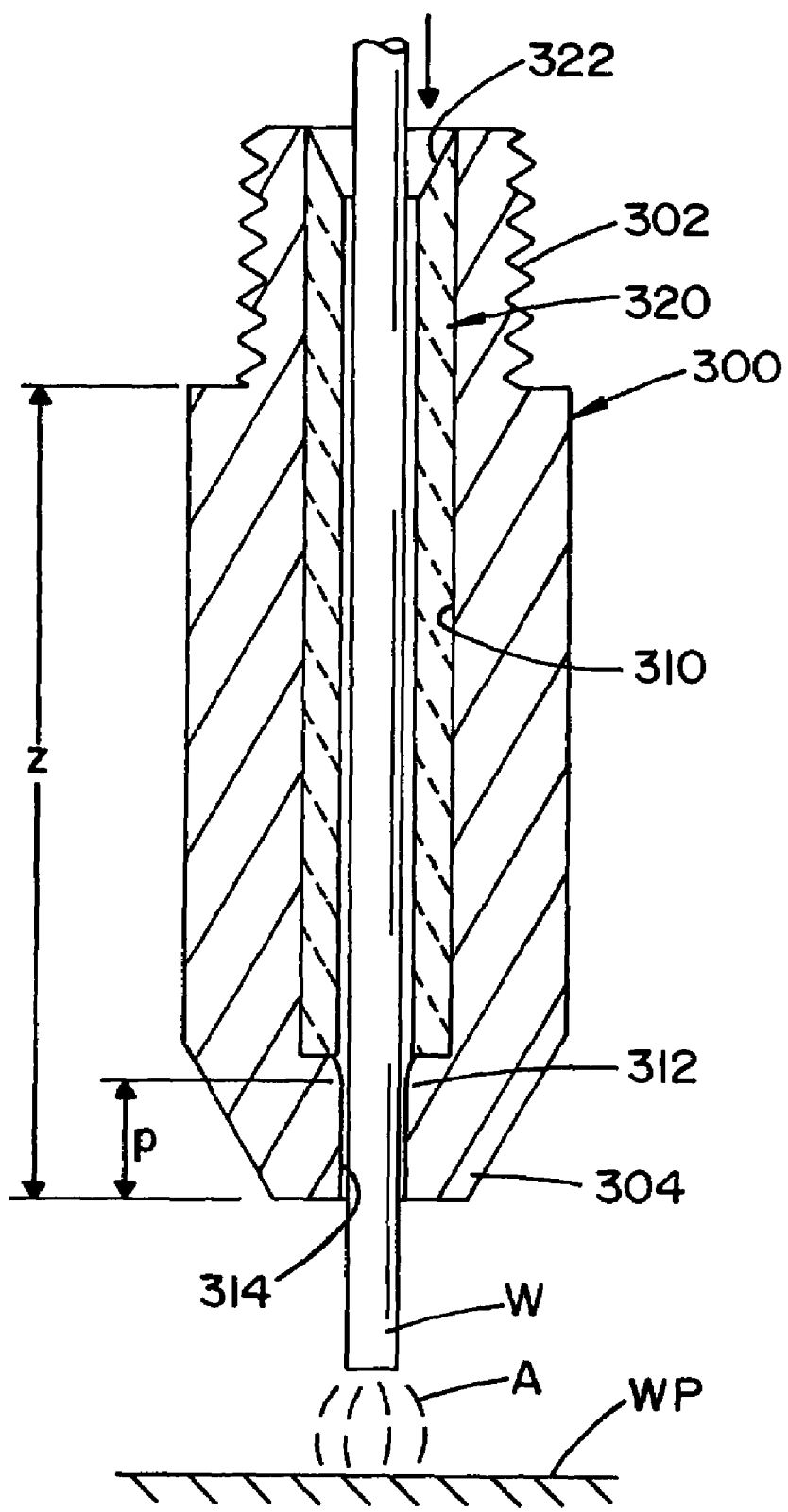
FIG. 9 is a cross-sectional view of contact tip used for aluminum having a broad feature of the preferred embodiment of the invention.

An alternative contact tip 300 for aluminum wire W is illustrated in FIG. 9 as including an uppermost threaded end 302 and a lowermost exit end 304 with a large diameter passage 310 terminating in a lower rim 312 defining a smaller opening 314 generally matching the diameter of wire W. To assure that the contact point is only in the relatively short area p, passage 310 is provided with a ceramic insulator sleeve 320 with a tapered upper end 322. Tip 300 provides a relatively precise contact point for wire W to allow a consistent aluminum welding process. This contact can be adjacent exit end 304 since it does not involve a metal spring 150 as used in the basic implementation of the present invention. This tip is a broad embodiment of the invention and does not involve the use of a pressure block; however, it provides a fixed point for electrical contact in the tip. This aspect of the invention uses a long contact tip with an element at a given location of passage 310 to assure a specific, fixed point of electrical contact. Rim 312 defines the fixed point. In the preferred embodiment, block 130 defines the specific point. Other modifications of this broad concept for aluminum pulse welding come within the invention.

The invention claimed is:

1. A contact tip for a welding gun, said tip having a central passage for a welding wire moving in a given direction toward a workpiece and receiving a welding signal by contact of said wire with said tip, said passage having an innermost end, an outermost exit end and a length of at least 1.5 inches; an opening in said contact tip intersecting said passage and generally perpendicular to said given direction; a pressure element slidably mounted in said opening for movement toward and against said wire; and a circular, sheet metal spring surrounding said contact tip and engaging said element to urge said element against said wire moving through said passage, said sheet metal spring has two distal ends spaced from each other and said tip includes a circular groove intersecting said opening for holding said spring around said tip, said circular groove including a key structure extending parallel to said given direction and between said distal ends of said spring to prevent rotation of said spring in said groove.

2. A contact tip as defined in claim 1 wherein said element is a pressure block of insulating material.

3. A contact tip as defined in claim 1 wherein said block has edge extending into said passage and with a tapered upper end of said edge and a tapered lower end of said edge.

4. A contact tip as defined in claim 3 wherein said block has a first edge extending into said passage and a second edge facing outwardly from said passage, with a tapered upper end on both of said edges and a tapered lower edge on both of said edges.

5. A contact tip as defined in claim 2 wherein said block has a first edge extending into said passage and a second edge facing outwardly from said passage, with a tapered upper end on both of said edges and a tapered lower edge on both of said edges.

6. A contact tip as defined in claim 5 wherein said passage is over sized for the diameter of the wire to move through said passage.

7. A contact tip as defined in claim 6 wherein said over size is at least 0.005 inches greater than the diameter of said wire.

8. A contact tip as defined in claim 7 wherein said passage has a raised pressure pad located opposite said opening.

9. A contact tip as defined in claim 5 wherein said passage is over sized for the diameters of various wires to move through said passage.

10. A contact tip as defined in claim 2 wherein said passage is over sized for the diameters of various wires to move through said passage.

11. A contact tip as defined in claim 2 wherein said element is a ceramic pressure block.

12. A contact tip as defined in claim 1 wherein said passage is over sized for the diameter of the wire to move through said passage.

13. A contact tip as defined in claim 12 wherein said over size is at least 0.005 inches greater than the diameter of said wire.

14. A contact tip as defined in claim 13 wherein said passage is over sized for the diameters of various wires to move through said passage.

15. A contact tip as defined in claim 12 wherein said opening is closer to said innermost end than outermost exit end of said passage.

16. A contact tip as defined in claim 1 wherein said passage is over sized for the diameters of various wires to move through said passage 17. A contact tip as defined in claim 16 wherein said element is a ceramic pressure block.

18. A contact tip as defined in claim 17 wherein said opening is closer to said innermost end than outermost exit end of said passage.

19. A contact tip as defined in claim 16 wherein said opening is closer to said innermost end than outermost exit end of said passage.

20. A contact tip as defined in claim 1 wherein said tip has a length greater than 1.0 inch.

21. A contact tip as defined in claim 20 wherein said opening is closer to said innermost end than outermost exit end of said passage.

22. A contact tip as defined in claim 1 wherein said opening is closer to said innermost end than outermost exit end of said passage.

23. A contact tip for a welding gun, said tip having a central passage for a welding wire moving in a given direction toward a workpiece and receiving a welding signal by contact of said wire with said tip, said passage having an innermost end, an outermost end and a length; an opening in said contact tip intersecting said passage and generally perpendicular to said given direction; a pressure element slidably mounted in said opening for toward and against said wire; a circular, sheet metal spring surrounding said contact tip and engaging said element to urge said element against said wire moving through said passage; and said passage having a raised pressure pad located opposite said opening, wherein said sheet metal spring has two distal ends spaced from each other and said tip includes a circular groove intersecting said opening for holding said spring around said tip, said circular groove including a key structure extending parallel to said given direction and between said distal ends of said spring to prevent rotation of said spring in said groove.

24. A contact tip as defined in claim 23 wherein said passage has an oversized portion between said pad and said exit end.

25. A contact tip as defined in claim 24 wherein said oversized portion supports an insulating sleeve with a central passage for receiving said welding wire as it moves through said tip.

26. A contact tip as defined in claim 25 wherein said tip has a length greater than 1.0 inch.

27. A contact tip as defined in claim 24 wherein said tip has a length greater than 1.0 inch.

28. A contact tip as defined in claim 23 wherein said tip has a length greater than 1.0 inch.

* * * * *